JOHN DAVIES & JOHN DAVIES.
HAULING APPARATUS.
APPLICATION FILED JAN. 10, 1914.
1,157,299.
Patented Oct. 19, 1915.
2 SHEETS—SHEET 2.
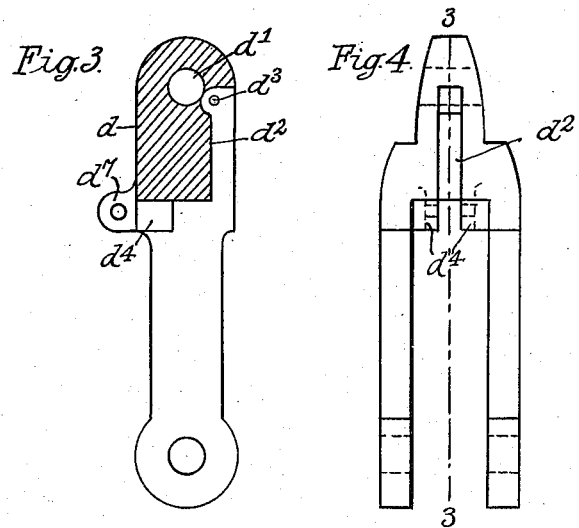
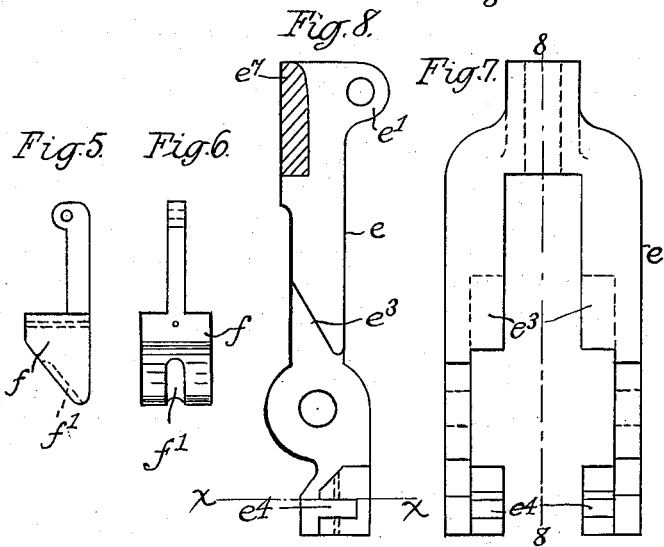
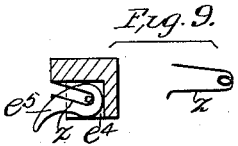

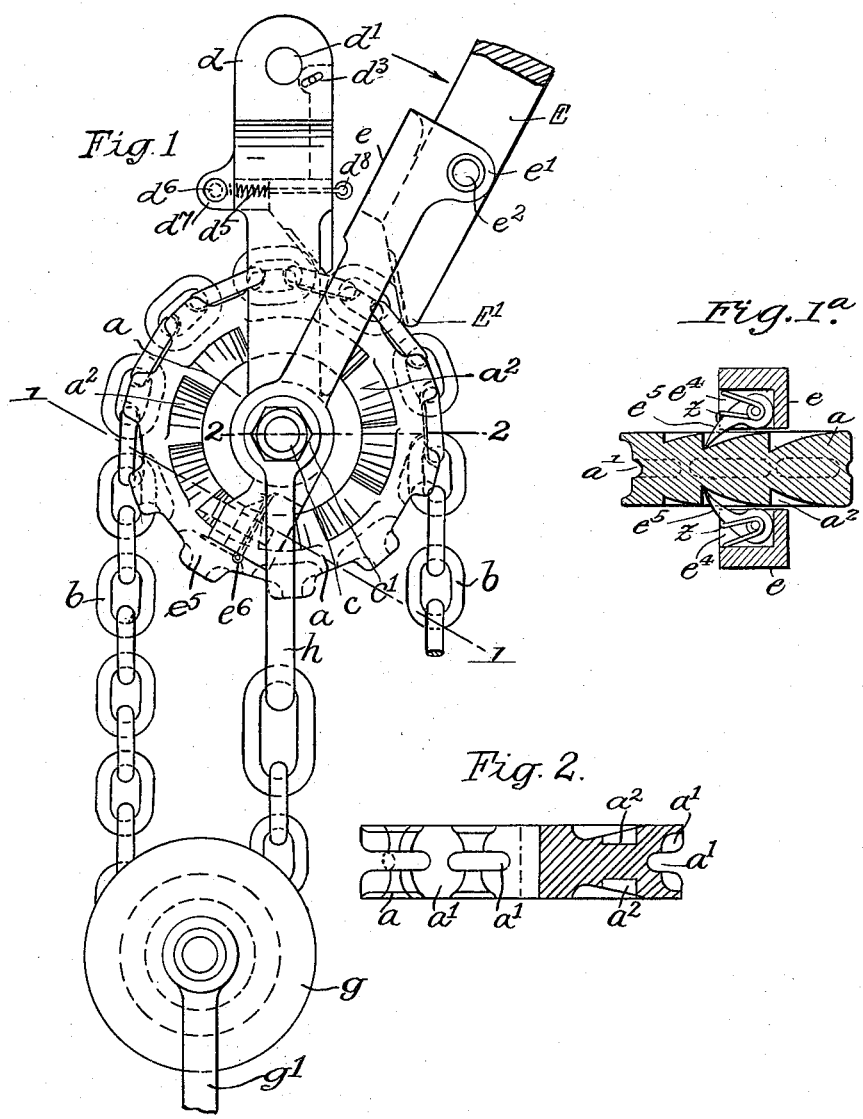

UNITED STATES PATENT OFFICE.

JOHN DAVIES, OF MISKIN, MOUNTAIN ASH, AND JOHN DAVIES, OF PENRHIWCEIBER, WALES.

HAULING APPARATUS.

1,157,299. Specification of Letters Patent. Patented Oct. 19, 1915.

Application filed January 10, 1914. Serial No. 811,424.

*To all whom it may concern:*

Be it known that we, JOHN DAVIES, a subject of the King of England, residing at Miskin, Mountain Ash, Wales, in the Kingdom of England, and JOHN DAVIES, a subject of the King of England, residing at Penrhiwceiber, Wales, in the Kingdom of England, have invented a new and useful Hauling Apparatus, of which the following is a specification.

The object of the present invention is to construct a reliable hauling apparatus which is operated by a hand lever.

According to our invention we construct a grooved chain-wheel on one or both faces with an annulus of ratchet teeth. This wheel is mounted on an axle carried by the ends of a forked bracket, which can be secured by means of a chain or hook to a beam or other fixed point. The bracket carries a spring-pawl which rides over the chain and toothed wheel and prevents these latter from running back. A forked operating lever is pivoted on the ends of the said axle and is prolonged beyond the axle. This lever carries at its ends one or two spring pawls to engage the ratchet teeth on one or both faces of the toothed wheel. The operating lever may be made in two parts pivoted together near to the toothed wheel, and it may be so constructed that it acts as a rigid lever for driving the toothed wheel, but when being pushed backward preparatory to another operative stroke, the outer longer part moves backward before it causes the shorter part to follow. This construction enables the inner end of the longer part of the lever to press upon the chain during the driving stroke and to slip over the chain during the return stroke.

In the following description it is assumed that the apparatus is arranged with the toothed wheel in a horizontal plane for hauling a weight along the ground.

The invention is illustrated in the accompanying drawings, in which:—

Figure 1 is a plan of the complete apparatus, part of the operating lever being broken away; Fig. 1$^a$ is a section on the line 1—1 of Fig. 1; Fig. 2 a view showing the toothed wheel half in elevation and half in section on the line 2—2 of Fig. 1; Fig. 3 a section on the line 3—3 of Fig. 4, and Fig. 4 is an edge view of the bracket; Figs. 5 and 6 are a plan and edge view of the retaining pawl; Fig. 7 is an edge view of the inner end of the driving lever, and Fig. 8 is a section on the line 8—8 of Fig. 7; Fig. 9 is a cross section on line X—X of Fig. 8 but showing the spring and the spring pawl.

$a$ is the chain wheel provided with grooves $a^1$ around its periphery to receive the links of a chain $b$. The wheel $a$ is formed on each of its faces with ratchet teeth $a^2$ and it is mounted on the axle $c$ passing through the arms of a bracket $d$ and the forked part $e$ of the operating lever. These three parts, $a$, $d$, $e$, are secured together by nuts $c^1$ screwing on to the ends of the axle $c$.

The forked bracket $d$ fits over the wheel $a$ and is formed with an aperture $d^1$ at one end by means of which it may be connected to a beam or other fixture. The bracket $d$ is recessed at $d^2$ to receive a pawl $f$ pivoted to the bracket $d$ at $d^3$. Two abutments $d^4$ are provided against which the pawl $f$ bears when drawn backward by a spring $d^5$, fastened at one end to the pawl $f$ and at the other end to the pin $d^6$ passing through lugs $d^7$. The pawl $f$ is formed with a groove $f^1$ at its rear to allow it to pass more readily over the projecting links of the chain. The pawl $f$ is preferably provided with a ring $d^8$ to enable it to be pulled out of engagement with the chain $b$ when it is desired to rotate the wheel $a$ backward. The forked part $e$ of the operating lever E fits outside the bracket $d$ and has lugs $e^1$ to receive a bolt $e^2$ by which the lever E is pivoted to the part $e$. The inner end of $e$ is beveled at $e^3$ to enable it to approach more closely the bracket $d$. At the ends of the forked part $e$ are formed recesses $e^4$ to receive pawls $e^5$ pivoted on the pins $e^6$. A suitable spring is employed between each pawl $e^5$ and one side of the recess $e^4$ to keep the pawl in contact with the ratchet teeth $a^2$.

When the lever E is moved in the direction of the arrow in Fig. 1, the parts 1 and $e$ move as a solid lever and its end E$^1$ is in contact with the chain $b$, but when the lever E is moved in the opposite direction to the arrow, it turns on its pin or bolt $e^2$ sufficiently to enable the end E$^1$ to pass over the links of the chain. In this last mentioned position the lever E bears against the solid back $e^7$ of part $e$ and carries same back. By reciprocating the lever E the wheel $a$ is intermittently rotated and moves the chain $b$, which may be attached directly to the article to be hauled. Or we may pass the chain $b$ round a pulley $g$ and connect its end to a link $h$ mounted on the bolt $c$. The pulley $g$ is provided with a hook $g^1$ to enable it to be attached to the article to be hauled. The end $E^1$ of the lever $E$ assists in keeping the chain $b$ on the wheel $a$ but is not essential, and the end $E^1$ may be cut away so that it does not come into contact with the chain while the parts $E$, $e$, are rigidly fixed together.

We claim:

1. A hauling apparatus consisting of a grooved chain-wheel, an axle for the wheel, a forked bracket carrying the axle and formed with a recess, an open-link chain upon the chain-wheel, a spring-controlled pawl pivotally suspended in said recess, there being a projecting nose on said pawl engaged in the chain-links, an operating lever pivoted on said axle, ratchet-pawls carried in the operating lever, there being ratchet-teeth formed in the faces of the chain-wheel, as described.

2. A hauling apparatus consisting of a grooved chain-wheel, an axle for said wheel, a bracket carrying the axle, an open-link chain upon the chain-wheel, a spring-pawl in said bracket to engage the chain, a two-part operating lever with one part pivoted on said axle, there being lugs formed at the outer end of said lever-part, a second lever part articulated in the lugs, an extension of said second part to engage in the chain-links, an extension of said first lever-part beyond the axle of the chain-wheel, ratchet pawls in the extension of said first lever-part, there being ratchet teeth in the faces of the chain-wheel, as described.

JOHN DAVIES.
JOHN DAVIES.

Witnesses:
BENJAMIN EDWARD WILLIAMS,
EDGAR DAVIES.